(12) United States Patent
Brown, Sr.

(10) Patent No.: US 11,685,609 B2
(45) Date of Patent: Jun. 27, 2023

(54) SPLIT DRIVE SPROCKET ASSEMBLY

(71) Applicant: Terry Michael Brown, Sr., Vincennes, IN (US)

(72) Inventor: Terry Michael Brown, Sr., Vincennes, IN (US)

(*) Notice: Subject to any disclaimer, the term of this patent is extended or adjusted under 35 U.S.C. 154(b) by 0 days.

(21) Appl. No.: 17/537,066

(22) Filed: Nov. 29, 2021

(65) Prior Publication Data

US 2022/0169449 A1 Jun. 2, 2022

Related U.S. Application Data

(60) Provisional application No. 63/118,759, filed on Nov. 27, 2020.

(51) Int. Cl.
*B65G 23/06* (2006.01)
*F16G 1/28* (2006.01)
*F16H 55/17* (2006.01)

(52) U.S. Cl.
CPC ............. *B65G 23/06* (2013.01); *F16G 1/28* (2013.01); *F16H 55/171* (2013.01); *B65G 2812/02148* (2013.01)

(58) Field of Classification Search
CPC . B65G 23/06; B65G 2812/02148; F16G 1/28; F16H 55/171
USPC .................................. 198/834, 835; 474/152
See application file for complete search history.

(56) References Cited

U.S. PATENT DOCUMENTS

| | | | | |
|---|---|---|---|---|
| 5,037,356 A | * | 8/1991 | Gladczak | F16H 55/12 474/902 |
| 5,158,505 A | * | 10/1992 | Woyach | B65G 23/06 474/98 |
| 6,086,495 A | * | 7/2000 | Stebnicki | F16H 55/46 474/96 |
| 2003/0144098 A1 | * | 7/2003 | Fye | F16H 55/30 474/96 |
| 2007/0161443 A1 | * | 7/2007 | Krisl | F16H 55/30 474/95 |
| 2015/0060242 A1 | * | 3/2015 | Carrara | B65G 45/10 198/834 |
| 2018/0305133 A1 | * | 10/2018 | Brown, Sr. | B65G 39/02 |

FOREIGN PATENT DOCUMENTS

| | | | | |
|---|---|---|---|---|
| CA | 2271711 | * | 9/2000 | B65G 23/06 |
| KR | 20070120194 | * | 12/2007 | F16H 55/17 |

* cited by examiner

*Primary Examiner* — James R Bidwell
(74) *Attorney, Agent, or Firm* — Oliff PLC

(57) ABSTRACT

A split drive sprocket assembly includes: a first sprocket portion and a second sprocket portion configured to be joined along an opposing mating surface to form a cylindrical sprocket body; a series of teeth extending radially from a circumferential end of the first sprocket portion and the second sprocket portion; a first shoulder connected to the first sprocket portion and extending radially so as to extend from an axial further than the teeth extends from the axial and spaced axially apart from the teeth; a second shoulder connected to the second sprocket portion and extending radially so as to extend from the axial further than the teeth extends from the axial and spaced axially apart from the teeth. The first sprocket portion and the second sprocket portion are configured to engage a belt with the teeth and the first and second shoulder are configured to overlap with the belt while the teeth are engaged with the belt.

7 Claims, 14 Drawing Sheets

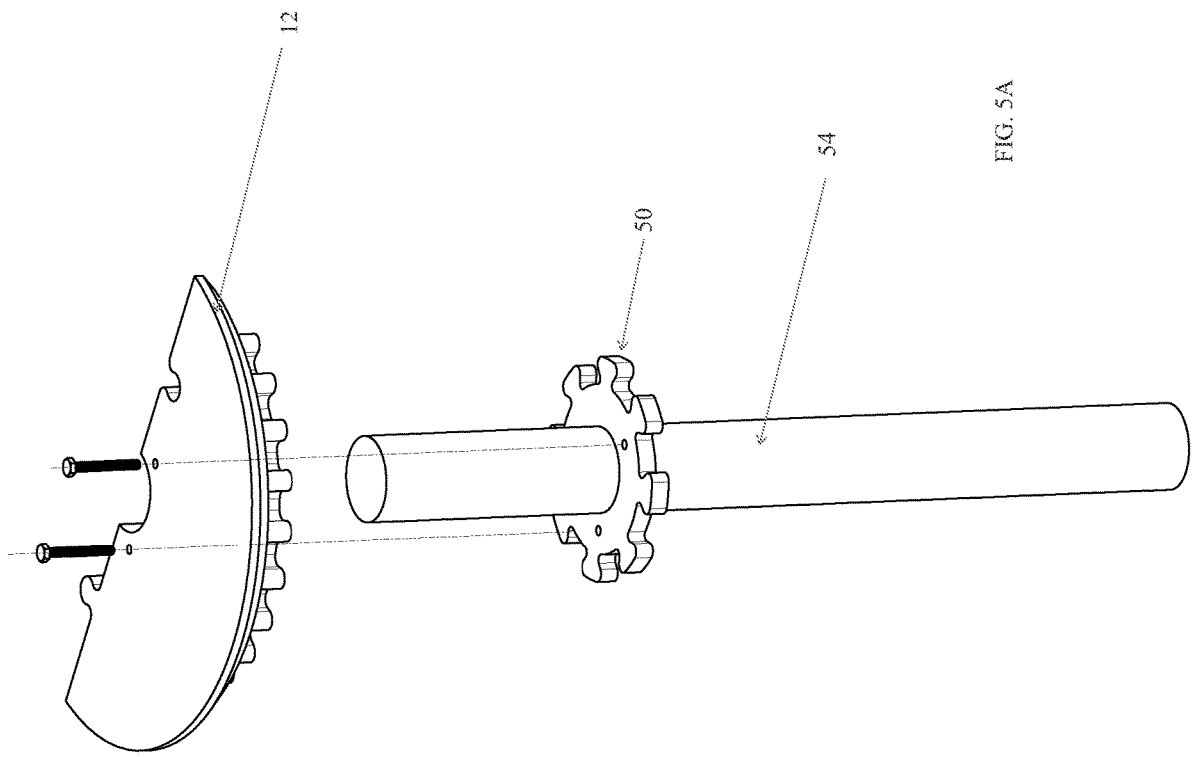

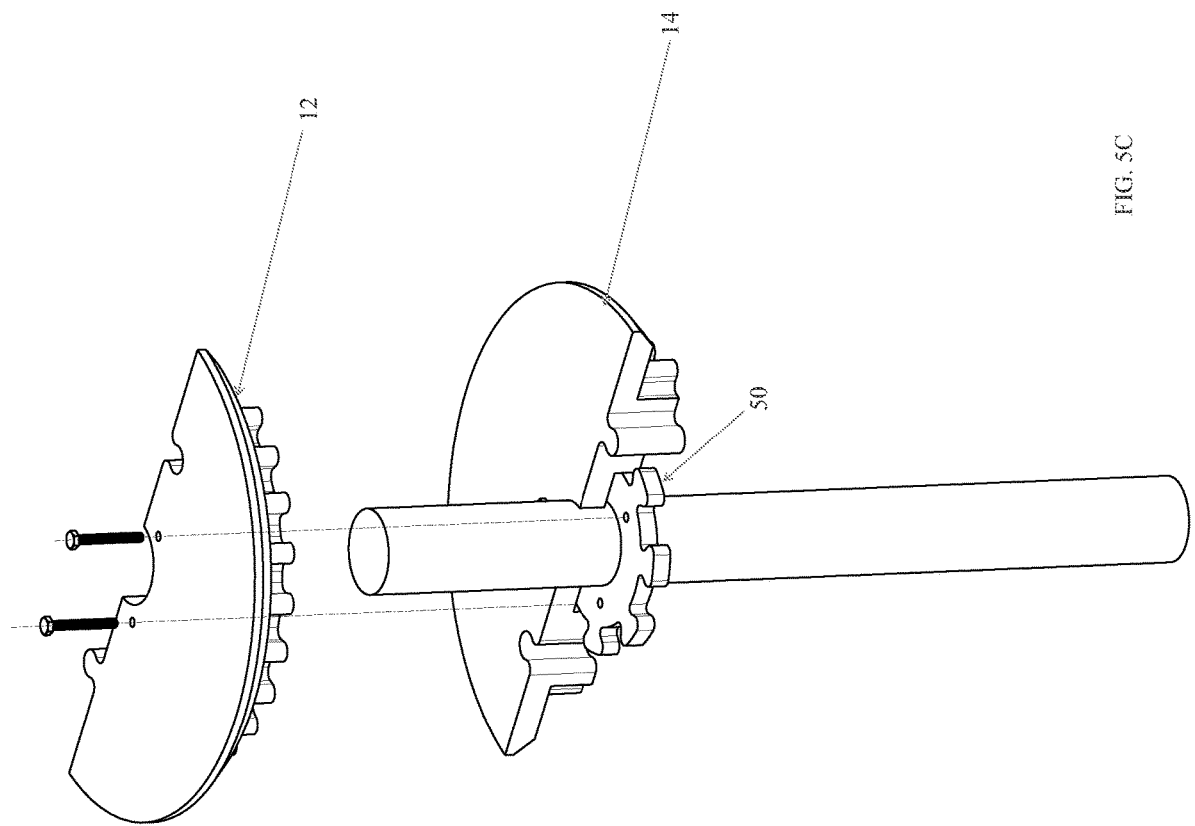

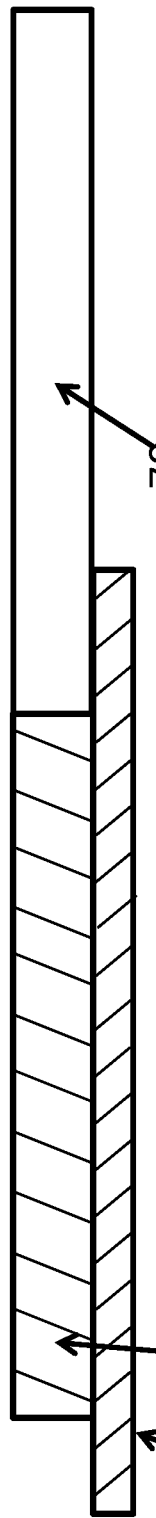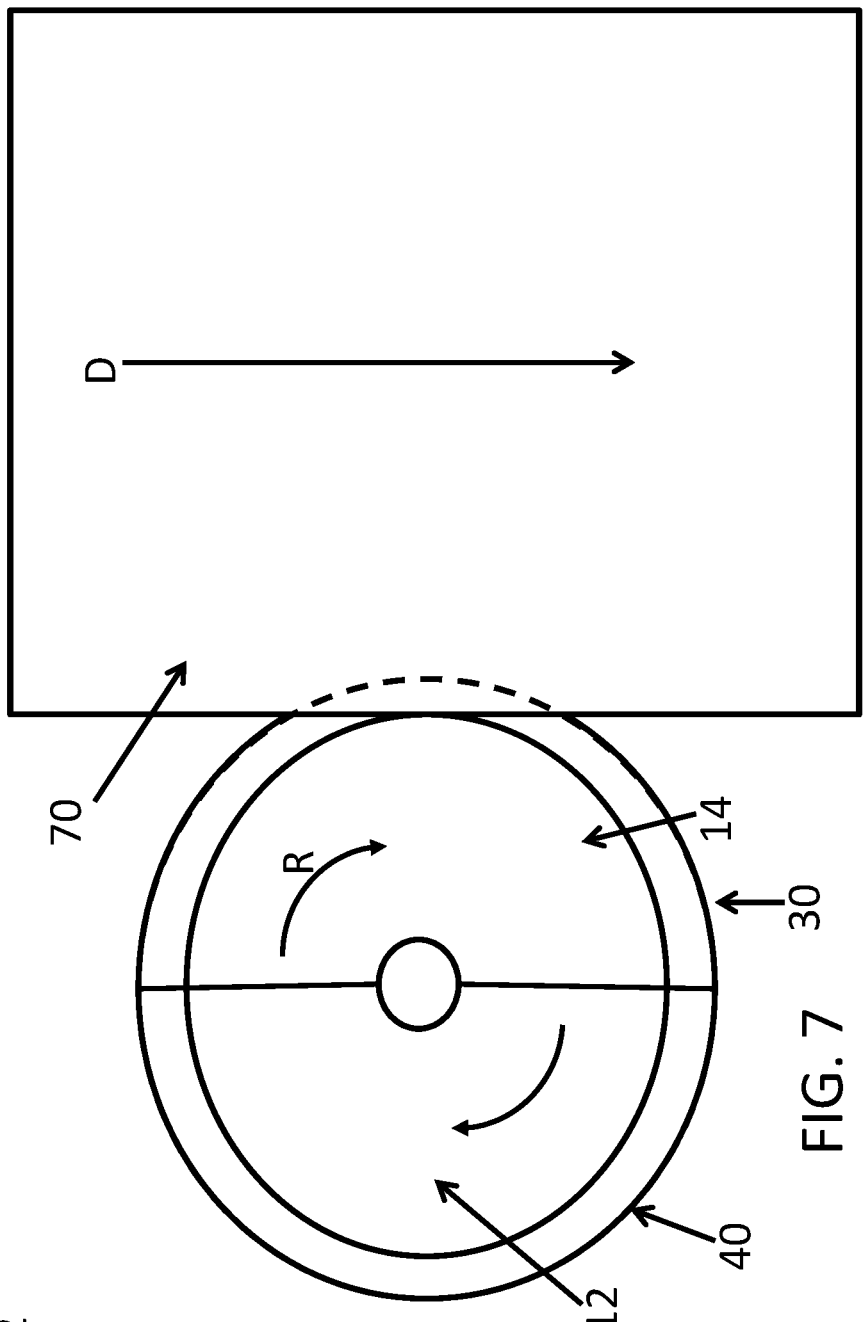

SPLIT DRIVE SPROCKET ASSEMBLY

FIELD OF THE INVENTION

The present invention relates to drive sprockets and, more particularly, to quick release split drive sprocket assemblies.

BACKGROUND

In a conveyor system, a drive sprocket is often used for driving a belt on which objects are conveyed. The drive sprocket is a wheel having teeth or cogs that engage with holes or indentations in the belt. The drive sprocket is also fixedly attached around a rotatable shaft. In operation, the rotation of the shaft causes the drive sprocket to rotate and, in turn, the drive sprocket moves the belt to thereby convert rotary motion of the shaft and sprocket assembly to a linear motion of the belt.

As machinery ages, parts will eventually wear down and need to be replaced. The current methods of replacing drive sprockets, however, are labor intensive and time consuming as they require a user to disassemble the entire shaft/sprocket system to access the rotatably-connected shaft. Thus, the shaft must also be disassembled to remove the drive sprocket. For example, disassembling the shaft may include removing bolts, bearings, lock collars, etc. To replace a drive sprocket, conventional methods require a large amount of downtime of the entire shaft/sprocket assembly.

As can be seen, there is therefore a need for a drive sprocket assembly that can be replaced more quickly to minimize downtime. Also, there is a need to allow users to replace a drive sprocket and its corresponding parts more easily and efficiently.

BRIEF SUMMARY OF SOME EMBODIMENTS

According to one aspect, a split drive sprocket assembly includes: a first sprocket portion and a second sprocket portion configured to be joined along an opposing mating surface to form a cylindrical sprocket body; a series of teeth extending radially from a circumferential end of the first sprocket portion and the second sprocket portion; a first shoulder connected to the first sprocket portion and extending radially so as to extend from an axial further than the teeth extends from the axial and spaced axially apart from the teeth; a second shoulder connected to the second sprocket portion and extending radially so as to extend from the axial further than the teeth extends from the axial and spaced axially apart from the teeth. The first sprocket portion and the second sprocket portion are configured to engage a belt with the teeth and the first and second shoulder are configured to overlap with the belt while the teeth are engaged with the belt.

According to one aspect, a first sprocket portion is joined with a second sprocket portion along an opposing mating surface to form a sprocket body. A series of teeth extend radially from a circumferential end of the first sprocket portion and the second sprocket portion. A first shoulder is connected to the first sprocket portion and extends radially so as to extend from an axial further than the teeth extends from the axial and spaced axially apart from the teeth, a second shoulder is connected to the second sprocket portion and extends radially so as to extend from the axial further than the teeth extends from the axial and spaced axially apart from the teeth. The teeth of the first sprocket portion and the second sprocket portion are engaged with a belt such that while the teeth are engaged with the belt, the first and second shoulder are configured to overlap with the belt. The sprocket body is rotated so that the teeth apply rotational torque on the belt to move the belt while the belt overlaps with the first and second shoulders.

BRIEF DESCRIPTION OF THE DRAWINGS

FIGS. 5A, 5B, 5C and 5D illustrate a method of installing the split drive sprocket assembly, according to the FIG. 1B embodiment, on a shaft.

FIG. 6 illustrates a side view of a split drive sprocket assembly driving a belt according to one embodiment.

FIG. 7 illustrates a top view of the split drive sprocket assembly driving a belt of FIG. 6 according to one embodiment.

DETAILED DESCRIPTION OF EMBODIMENTS

The following detailed description includes exemplary implementations of the invention. The description merely defines the general principles of the invention and is not intended to limit the invention, but should include other alternatives of which one of ordinary skill in the art will become aware from an understanding of the details of the following disclosure.

Figure 5B:
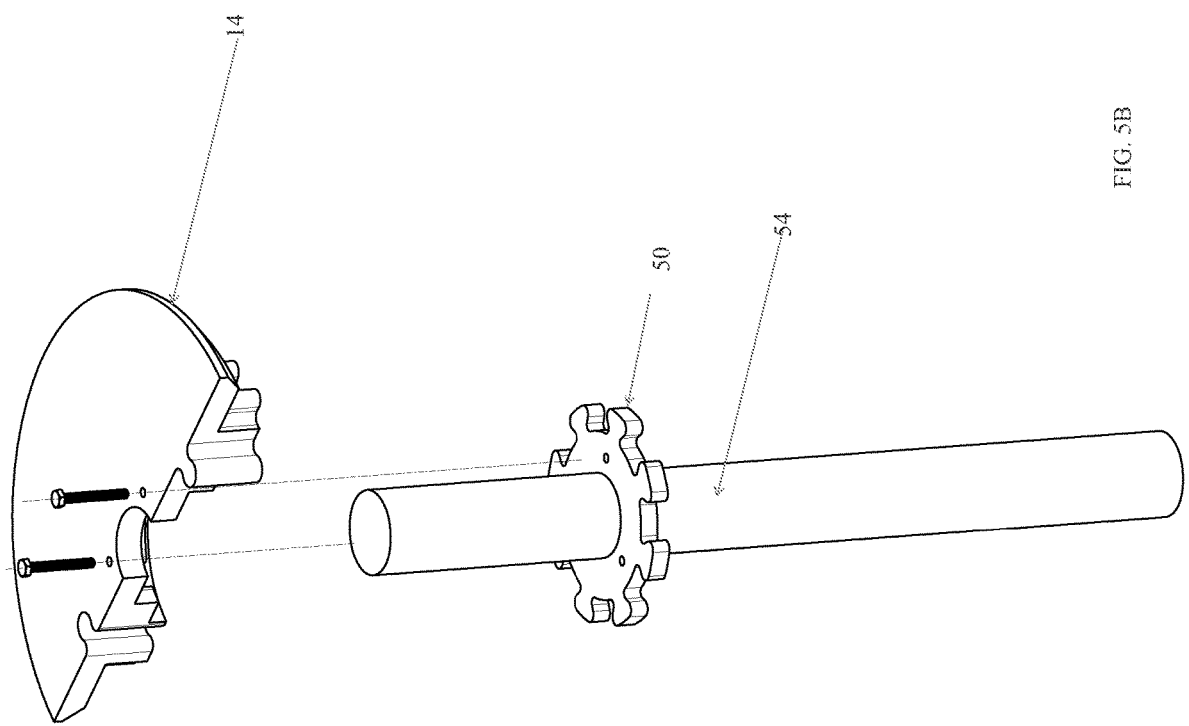
Figure 5D:
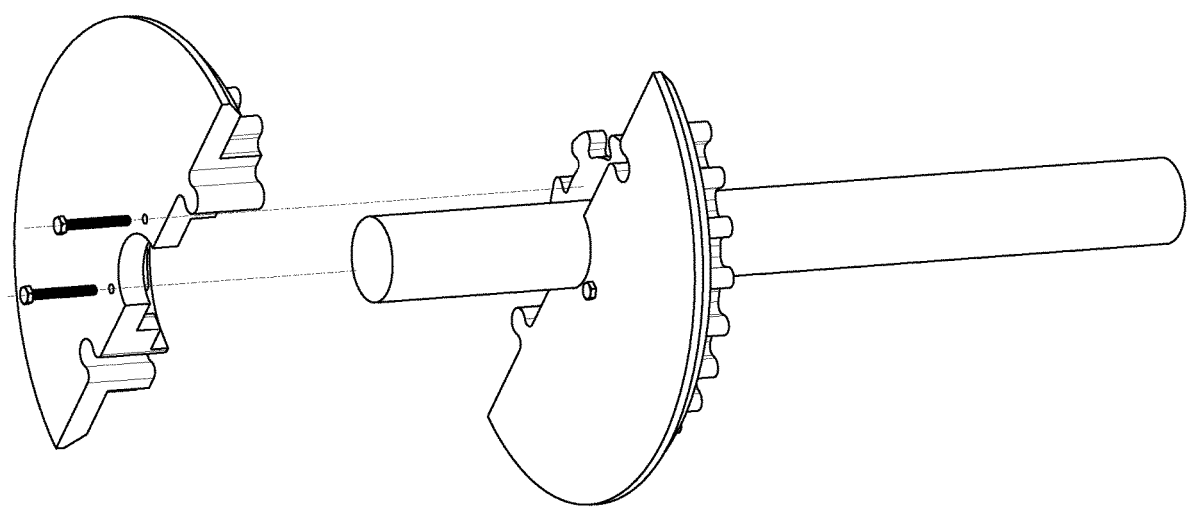

Broadly, the present disclosure describes embodiments of drive sprocket assemblies and, more particularly, drive sprocket assemblies having a sprocket with a "split" construction including two or more separable pieces forming a wheel of the sprocket. With such a split configuration, the drive sprocket assembly can be quickly released from a shaft (54 from FIGS. 5 and 6) on which the drive sprocket assembly is attached during operation.

The construction of the drive sprocket assembly allows operation in an engaged condition when the pieces of the sprocket are connected together and connected to the shaft. The construction of the drive sprocket assembly also enables a disengaged or disassembled condition when the pieces are separated from each other and from the shaft to allow the replacement of the drive sprocket, which can be done without removing the shaft or its corresponding parts.

Figure 1A:
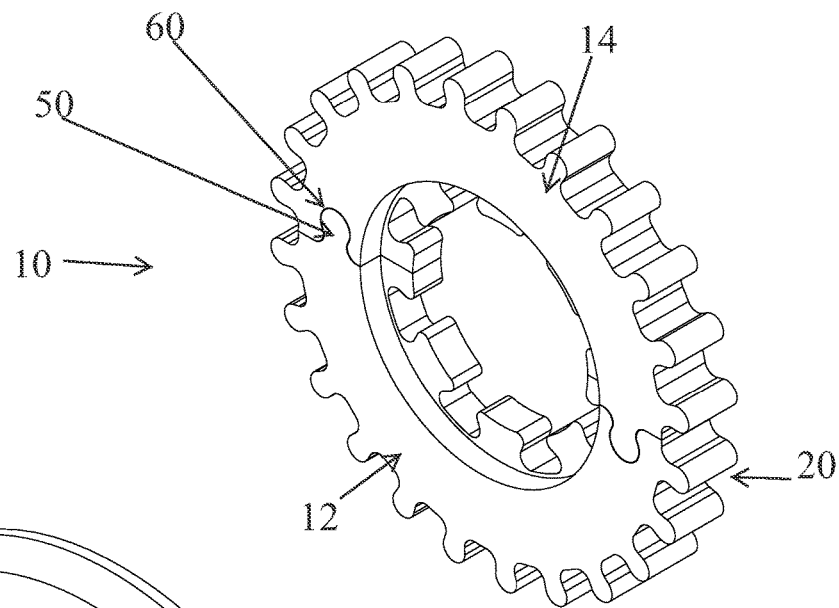
FIG. 1A is a schematic diagram showing a front elevation view of a split drive sprocket assembly, according to one embodiment.
Figures 4A, 4B:
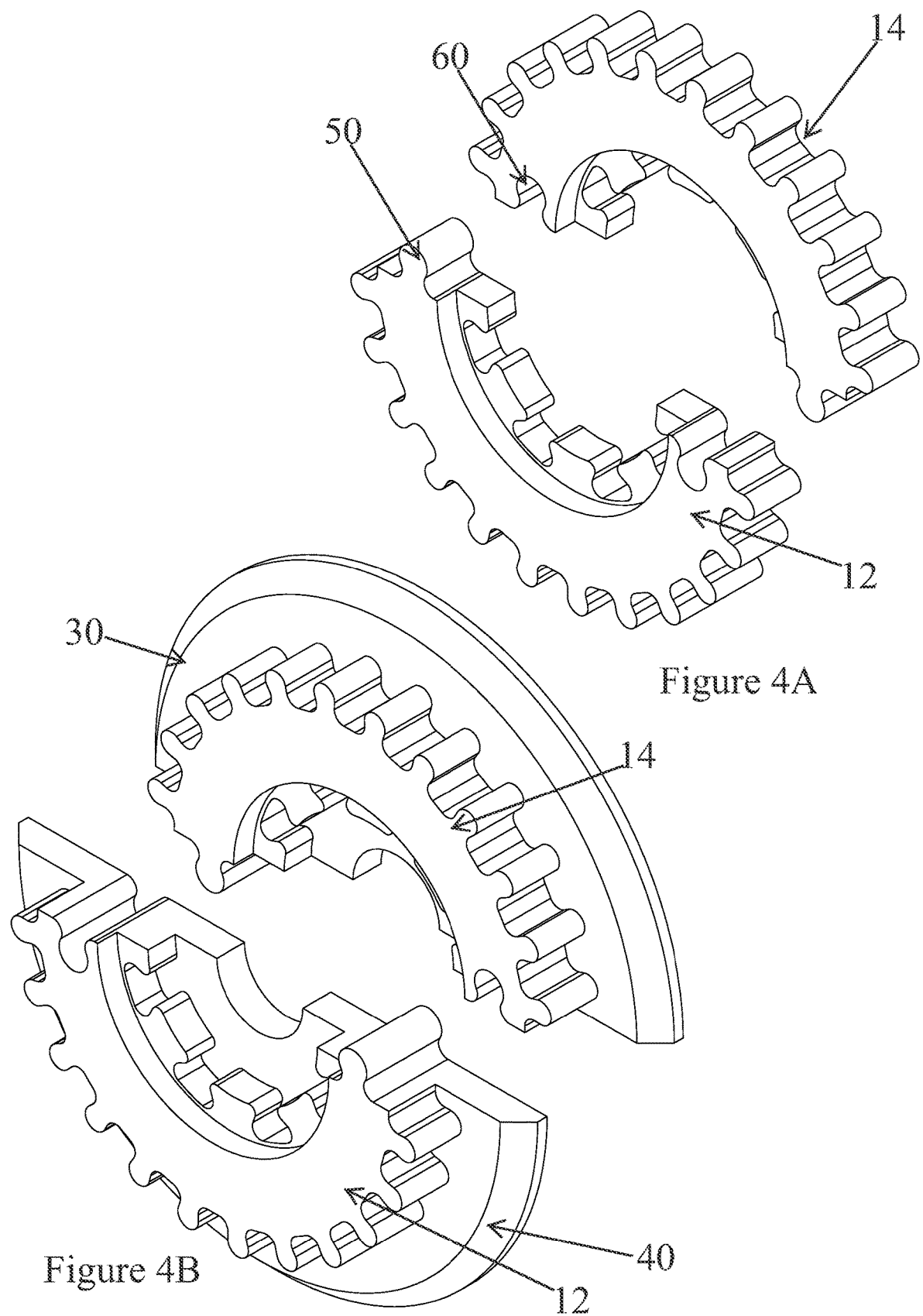
FIG. 4A is an exploded schematic diagram showing a front elevation view of the split drive sprocket assembly of FIG. 1A, according to one embodiment.
FIG. 4B is an exploded schematic diagram showing a front elevation view of the split drive sprocket assembly of FIG. 1B, according to one embodiment.

FIG. 1A is a schematic diagram showing a front elevation view of an embodiment of a split drive sprocket assembly 10. FIG. 4A is an exploded schematic diagram showing a front elevation view of the split drive sprocket assembly 10 of FIG. 1A. FIGS. 1A, 2A, 3A, and 4A each shows the split drive sprocket assembly 10 in a connected or engaged configuration where a first sprocket portion 12 is connected to a second sprocket portion 14. Each of the portions 12, 14 include a plurality of teeth 20 or cogs equally spaced apart from each other along their respective circumferential surfaces. The teeth 20 may be dimensioned and adapted so as to drive a belt (not shown) of a conveyor system. In some embodiments, the teeth 20 may include a slide (not shown) that would not drive other components.

The first sprocket portion 12 and second sprocket portion 14 are assembled together (e.g., assembled on a shaft) to form the split drive sprocket assembly 10. The first sprocket portion 12 includes a first inner curved surface and the second sprocket portion 14 includes a second inner curved surface. Together, the first and second inner surfaces define a cylindrical surface defining an axis. The axis also corresponds to the axis of rotation of the split drive sprocket assembly 10 and the shaft (not shown) that is configured to drive the split drive sprocket assembly 10. The shaft (shown as 54 in FIGS. 5 and 6) is configured to have a smaller male sprocket 50 that has male prongs which mate with corresponding female receivers of the first and second sprocket portions 12, 14 which are closest to the axis of rotation. The male sprocket 50 is configured to be bolted to a shoulder of a bracket via respective holes (e.g., 3 holes) to allow for the male sprocket 50 and bracket to fix the first and second sprocket portions 12, 14 in place when mated together. This allows the shaft to rotate the first and second sprocket portions 12, 14 using the male sprocket 50.

The first and second sprocket portions 12, 14 may be held together via fasteners, such as bolts, having spiral ridges for engaging with corresponding inside ridges of bores in the male and second sprocket portions 12, 14. It should be noted that the fasteners and bores may be located within an inside portion of the male and second sprocket portions 12, 14. In other embodiments, the fasteners may be configured to engage with one or more inserts contained within each of the bores in either or both of the male and second sprocket portions 12, 14.

It is noted that the fasteners may be connected to the first sprocket portion 12 and second sprocket portion 14 via any way. For example, the fasteners may be aligned parallel to the axis of rotation and enter any portion of the first sprocket portion 12 and second sprocket portion 14 to thereby connect these parts together. In one embodiment, the fasteners are connected in this manner to both the first sprocket portion 12 and second sprocket portion 14 via holes in a flange that secures both the first sprocket portion 12 and second sprocket portion 14 together. In another embodiment, the fasteners are aligned in a direction perpendicular to the axis of rotation and traverse through at least a portion of the first sprocket portion 12 and then through at least a portion of second sprocket portion 14. In any event, the first sprocket portion 12 and second sprocket portion 14 may be secured together via fasteners.

In another embodiment, the first sprocket portion 12 and second sprocket portion 14 are secured using a mating of a protrusion 50 and a recess 60 in each of the first sprocket portion 12 and second sprocket portion 14. The mating of the protrusion 50 and recess 60 makes it so that the first sprocket portion 12 and second sprocket portion 14 are prevented from moving in any direction except in the axial direction.

Figure 1B:
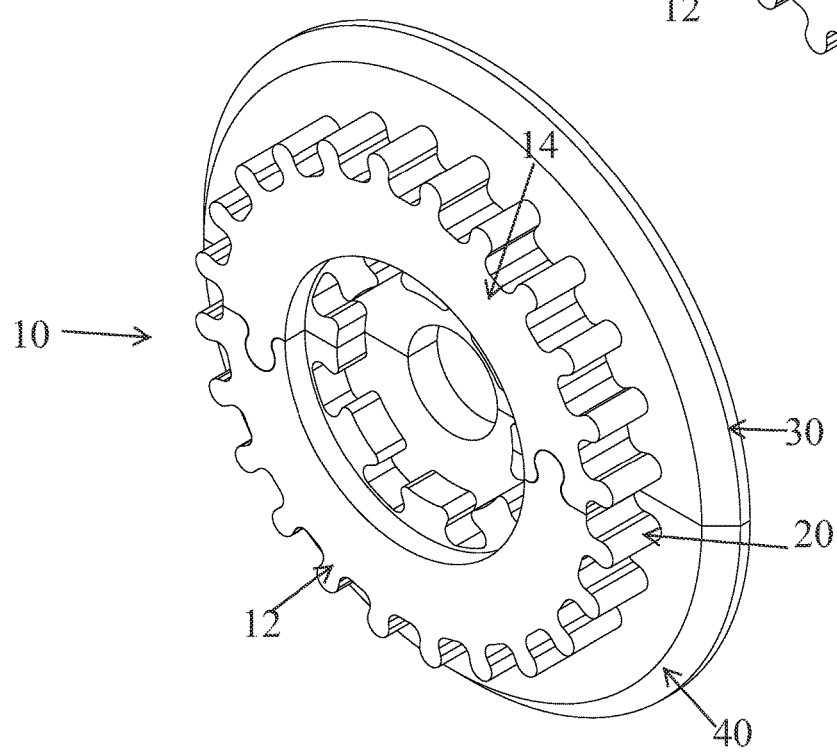
FIG. 1B is a schematic diagram showing a front elevation view of a split drive sprocket assembly, according to another embodiment.
Figure 2A:
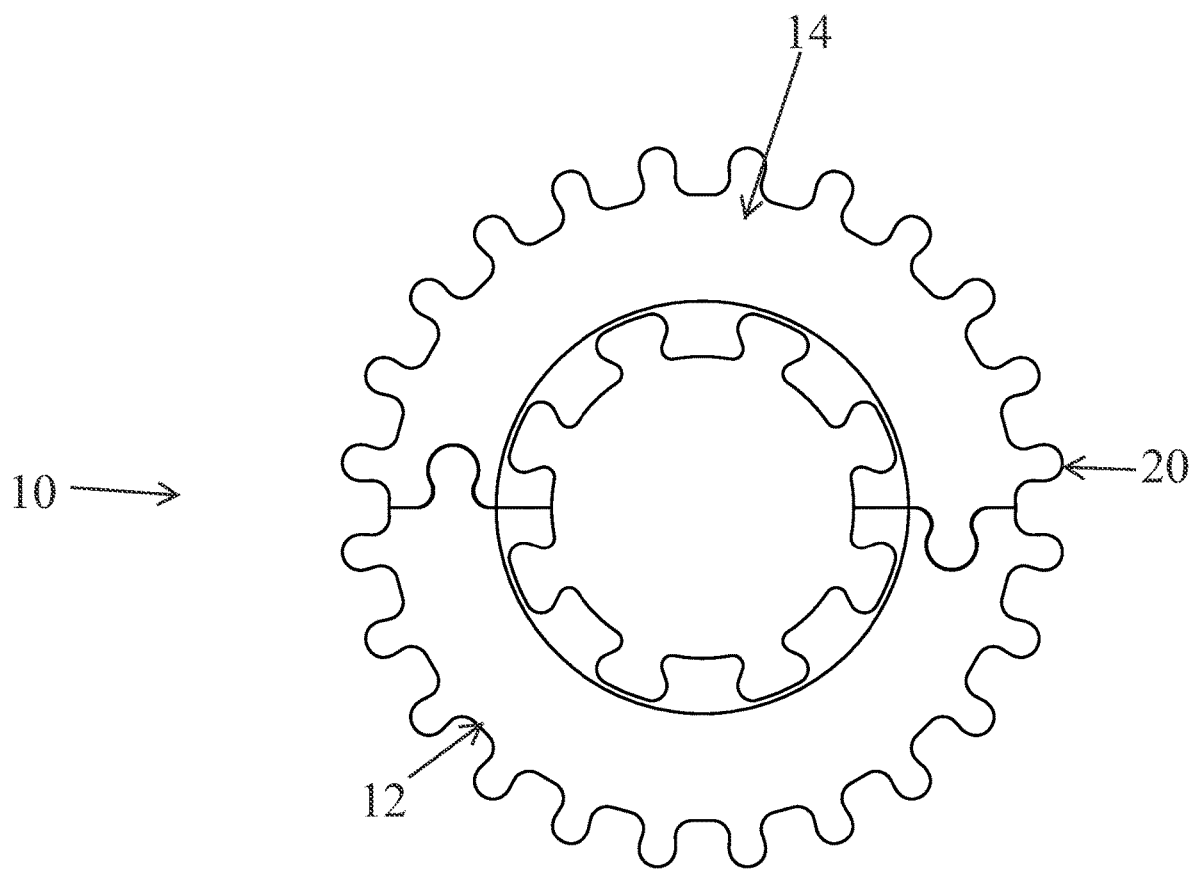
FIG. 2A is a schematic diagram showing a front view of the split drive sprocket assembly, according to the FIG. 1A embodiment.
Figure 2B:
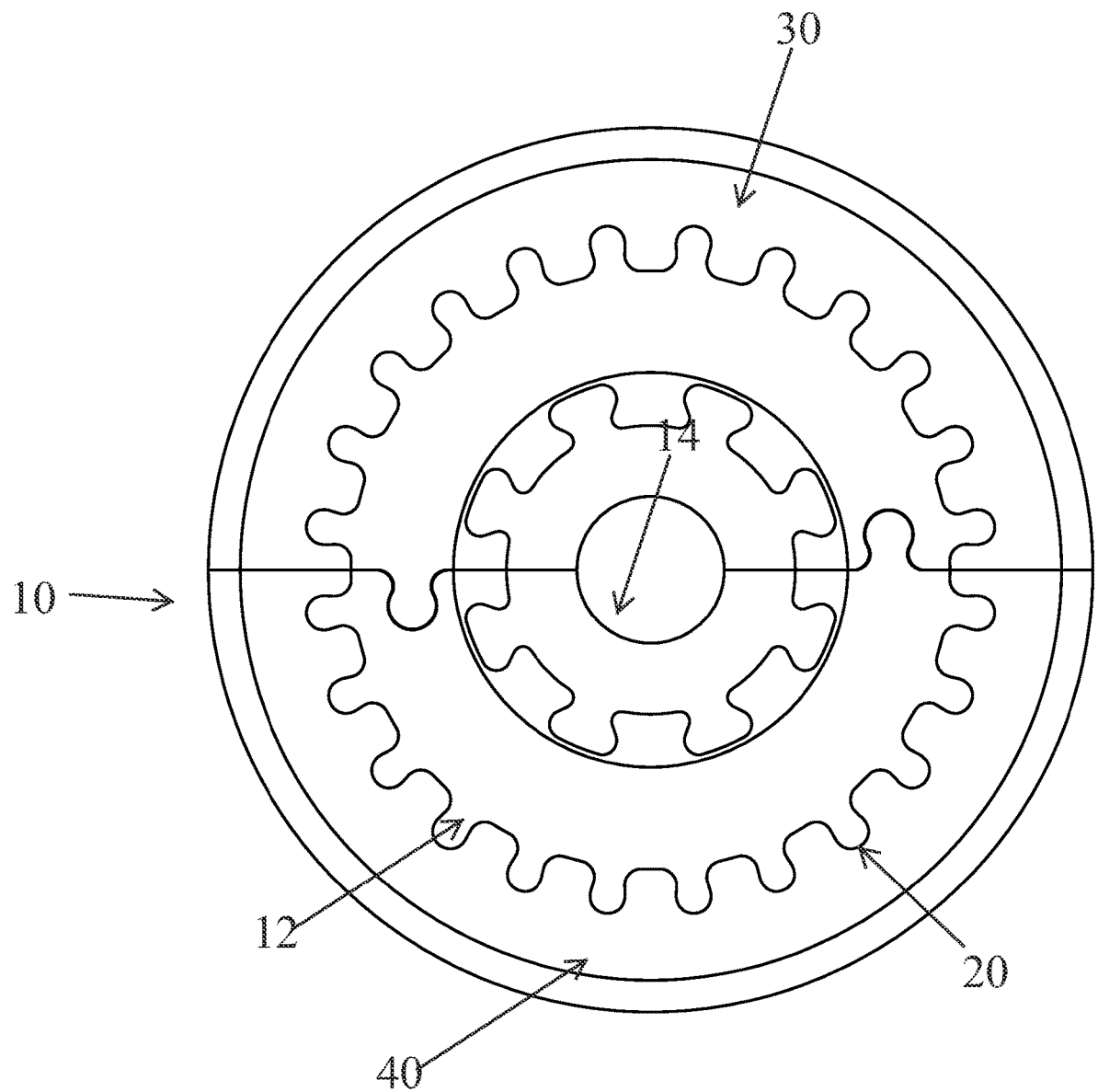
FIG. 2B is a schematic diagram showing a front view of the split drive sprocket assembly, according to the FIG. 1B embodiment.
Figures 3A, 3B:
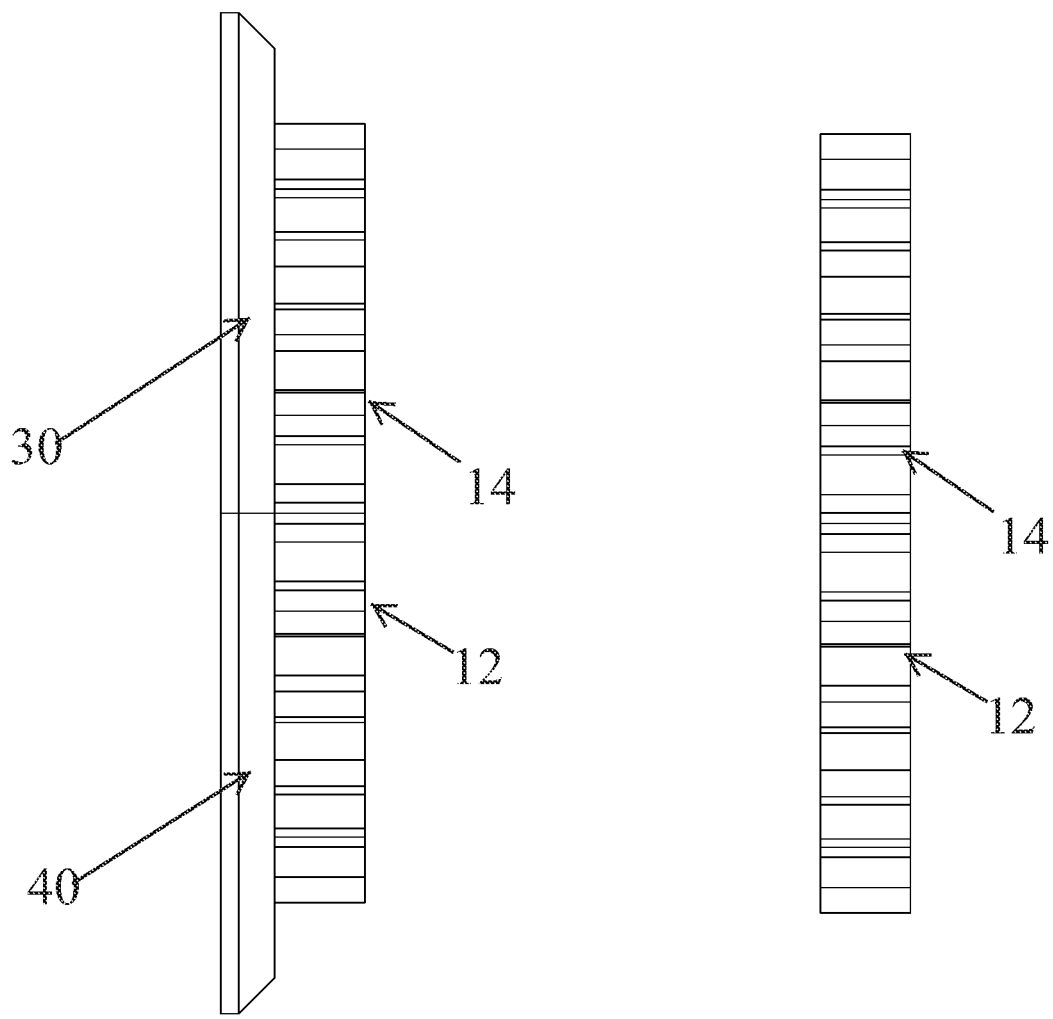
FIG. 3A is a schematic diagram showing a side view of the split drive sprocket assembly, according to the FIG. 1A embodiment.
FIG. 3B is a schematic diagram showing a side view of the split drive sprocket assembly, according to the FIG. 1B embodiment.

FIGS. 1B, 2B, 3B and 4B each illustrates the sprocket from FIG. 1A but includes a shoulder 40, 30 that is connected to one side of the first sprocket portion 12 and second sprocket portion 14, respectively, as shown in FIG. 1B. The shoulders 40, 30 each extend radially from the axis of rotation further from the teeth 20 so that the shoulders 40, 30 will extend over the belt while the outer edge teeth of the first and second sprocket portion 12, 14 engage the belt moving the belt. This allows the teeth of the first and second sprocket portion 12, 14 to lock into and move the belt at the same time that the shoulder binds the edge of the belt (so that the shoulder is a boundary that does not allow the edge of the belt to extend past or to move on top of) in order to hold the belt in place as it is driven by the sprocket 10.

FIGS. 5A-D illustrate a shaft with a split drive sprocket assembly, according to the FIG. 1B embodiment. As shown, in FIGS. 5A-D, the sprocket is connected around the shaft by the first sprocket portion 12 and second sprocket portion 14 being slid onto the male sprocket 50 (whereby the male sprocket is integral with or attached to (e.g., welding etc.) the shaft 54). The first and second sprocket portions 12, 14 are slid onto the male sprocket with the shoulders 40, 30 being orientated on top or upwardly (so that the shoulders 40, 30 are on the side of the sprocket furthest away from the male sprocket 50). FIGS. 5A-D show the first and second sprocket portions 12, 14, respectively, being slid onto the male sprocket with the shoulders 40, 30 orientated upwardly.

The shaft 54 includes the male sprocket 50 mentioned above that has protrusions that all mate with corresponding female portions (or indentions) of the first sprocket portion 12 and second sprocket portion 14 so that the male sprocket 50 is connected and mated with both the first sprocket portion 12 and second sprocket portion 14. Once this is done, the first sprocket portion 12 and second sprocket portion 14 may be connected together according to one or more embodiments, some of which are explicitly discussed above.

The first and second sprocket portion 12, 14 may be connected to the male sprocket 50 via bolts so that the first sprocket portion 12 and second sprocket portion 14 do not slide off of the male sprocket 50 and thus are securely fastened to the shaft via the metal male sprocket 50.

In another embodiment, the first and second sprocket portion 12, 14 may be secured in placed by being sandwiched between the male sprocket 50 and a lock collar (not shown) that is attached to the shaft on a side of the sprocket opposite of the side of the sprocket that the male sprocket is disposed. In this regard, the first and second sprocket portions 12, 14 cannot move past the lock collar (which is secured to the shaft) and the first and second sprocket portions 12, 14 cannot move past the male sprocket 50 (which is also attached or part of the shaft 54) so that the lock collar and the male sprocket 50 secure the first and second sprocket portions 12, 14 in place.

As shown in FIGS. 6 and 7, the split drive sprocket assembly 10 is shown from a side view and top view, respectively, driving a belt 70, according to one embodiment. As shown in FIGS. 6 and 7, the shoulder 40, 30 is configured to be just under the belt while the belt is being driven. This allows for the teeth (not explicitly shown) of the sprocket assembly 10 to stay aligned with the side of the belt 70 so the belt 70 does not separate from the sprocket assembly 10. In this regard, the shoulder 40, 30 functions as a guide to guide the teeth into the belt 70 to drive the belt 70. When the sprocket assembly 10 rotates in direction R, the belt 70 moves in direction D.

As shown in FIGS. 1-5, the first and second sprocket portions 12, 14 each have a male protrusion that fits into a corresponding female portion like a puzzle piece. In this regard the two pieces are configured to fit together like puzzle pieces and can be secured together after mated with each other.

FIGS. 8-12 illustrate differing embodiments of how the sprocket portions 112 and 114 can be connected to each other. Sprocket portions 112 and 114 are similar to split drive sprocket portions 12 and 14 of FIGS. 1-7 and include shoulder 30, 40. FIGS. 8-12 will now be described below.

Figure 8:
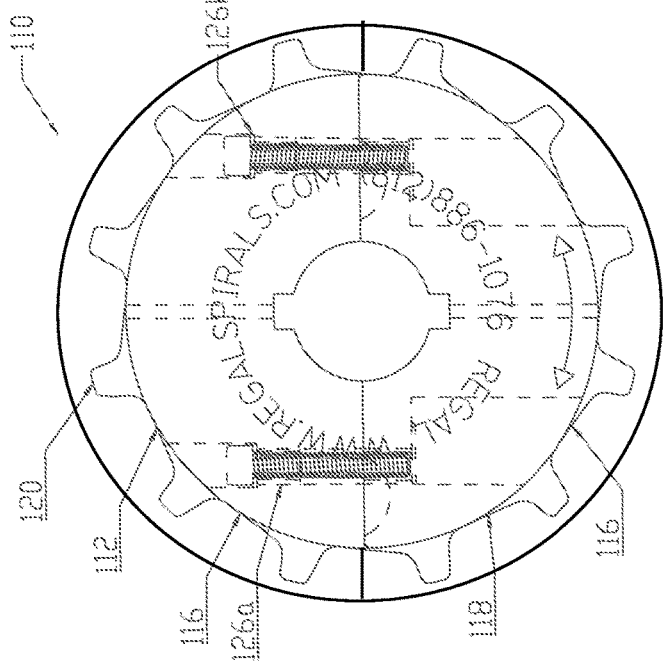
FIG. 8 is a schematic diagram showing a front elevation view of a split drive sprocket assembly, according to one embodiment.

FIG. 8 is a schematic diagram showing a front elevation view of an embodiment of a split drive sprocket assembly 110. FIG. 8 shows the split drive sprocket assembly 110 in a connected or engaged configuration where a male sprocket portion 112 is connected to a female sprocket portion 114. Each of the portions 112, 114 may include a plurality of teeth 120 or cogs equally spaced apart from each other along their respective circumferential surfaces 116, 118. The teeth 120 may be dimensioned and adapted so as to drive a belt 70 of a conveyor system. In some embodiments, the teeth 120 may include a slide (not shown) that would not drive other components.

Figure 9:
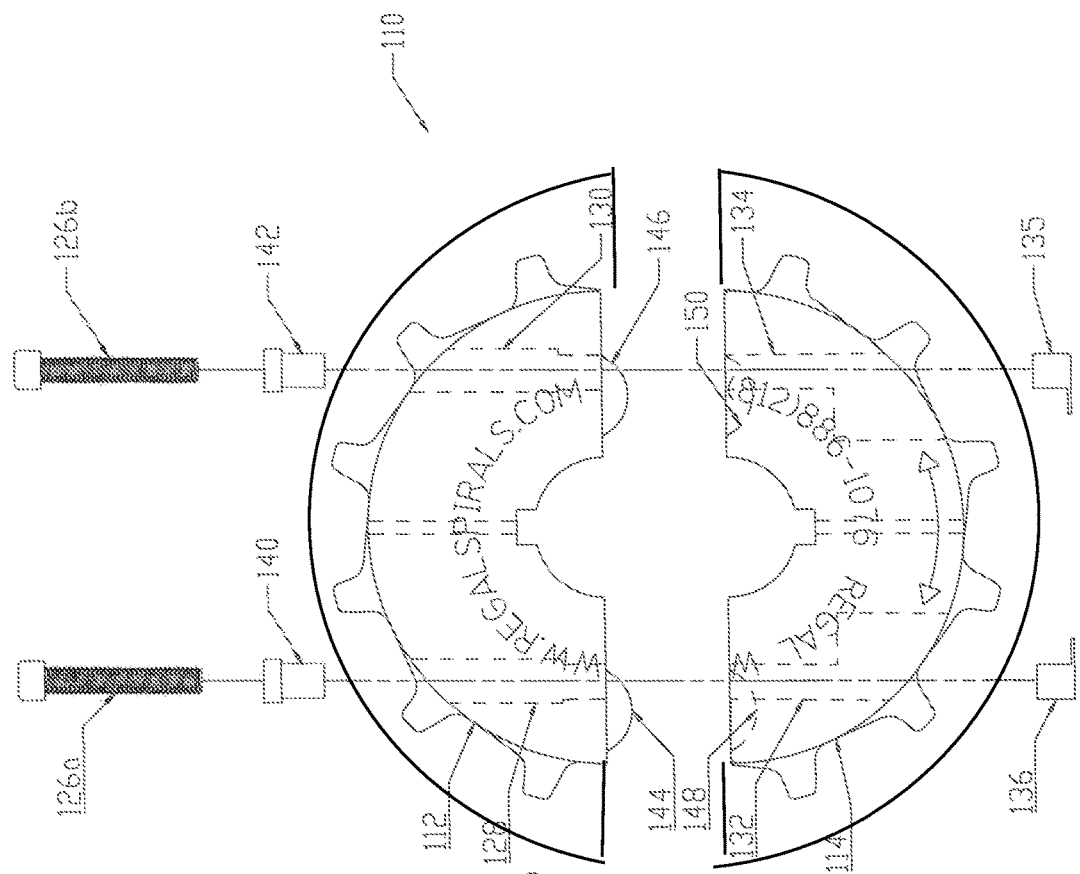
FIG. 9 is an exploded schematic diagram showing a front elevation view of the split drive sprocket assembly of FIG. 8, according to one embodiment.

FIG. 9 is an exploded schematic diagram showing a front elevation view of the split drive sprocket assembly 110 of FIG. 8, where the split drive sprocket assembly 110 is shown in its disengaged or disassembled condition. The split drive sprocket assembly 110 is configured with a number of bores. For example, the male sprocket portion 112 includes a first bore 128 (shown in phantom) for receiving a first fastener 126*a* and a second bore 130 (also shown in phantom) for receiving a second fastener 126*b*. The female sprocket portion 114 includes a third bore 132 (shown in phantom) for receiving the first fastener 126*a* and a fourth bore 134 for receiving the second fastener 126*b*. As mentioned above, the fasteners 126 may be configured to engage with ridges on the inside surfaces of the bores 128, 130, 132, 134.

In some embodiments, the bores 128, 130, 132, 134 may be configured without ridges, but may be configured to accommodate inserts that are fixed with the fasteners 126. For example, a first insert 140 may be inserted in the first bore 128 and a second insert 142 may be inserted in the second bore 130 of the male sprocket portion 112. Also, a third insert 136 may be inserted in the third bore 132 and a fourth insert 135 may be inserted in the fourth bore 134 of the female sprocket portion 114. At least the third and fourth inserts 135, 136 include a tab on one side and insides surfaces with ridges corresponding to the ridges of the fasteners 126 for enabling a secure connection. The inserts 136, 138, 140, 142 may be fixedly attached within the bores 128, 130, 132, 134, such that the fasteners 126 can connect the sprocket portions 112, 114 together.

The first and third bores 128, 132 are aligned when the sprocket assembly 110 is assembled so that fastener 126*a* extends through the respective bores in a direction that is transverse to the axis x of rotation of the shaft. The second and fourth bores 130, 134 are also aligned when the sprocket assembly 110 is assembled so that fastener 126*b* extends through the respective bores in a direction that is also transverse to the axis x of rotation of the shaft.

It should be noted that, in one embodiment, the bores shown on the sprocket may have a configuration as shown in FIG. 4 where there is a shoulder which allows for the insert to make contact with. The shoulder is shown on both segments 10, 18 and prevents the insert and head of the fastener from moving radially toward the center of the sprocket/roller.

Also shown in FIG. 9 are engagement elements for engaging the male sprocket portion 112 with the female sprocket portion 114. The male sprocket portion 112 includes tabs 144 and 146, which are configured to be inserted within indentations 148 and 150, respectively, of the female sprocket portion 114 in the assembled condition.

The bores 128 and 132 are oriented in a direction that is perpendicular to the rotational axis x and is offset from the axis x such that the bores 128, 132 do not intersect the axis x. Also, bores 130 and 134 are oriented in a direction that is perpendicular to the rotational axis x and in some embodiments may be parallel with the direction of the bores 128, 132. Also, the direction of bores 130, 134 is also offset from the axis x such that the bores 130, 134 do not intersect the axis x.

Figure 10:
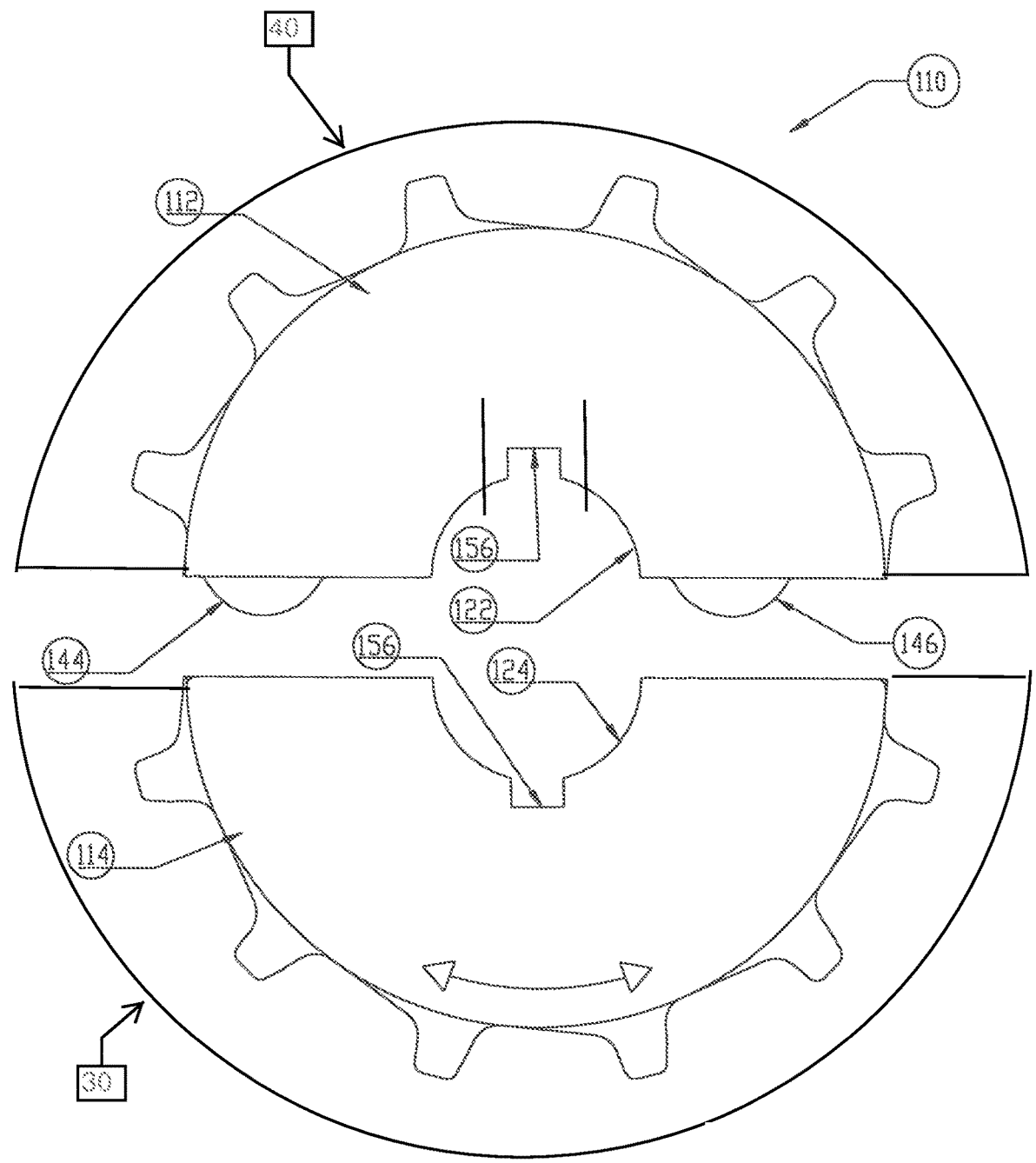
FIG. 10 is a diagram showing a front elevation view of the separated halves of the split drive sprocket assembly of FIG. 8, according to one embodiment.

FIG. 10 is a diagram showing a front elevation view of the separated halves of the split drive sprocket assembly 110. The first inner curved surface 122 of the male sprocket portion 112 includes a first notch 154 that is configured to engage with a step portion of a shaft. Also, the second inner curved surface 124 of the female sprocket portion 114 includes a second notch 156 that is configured to engage with another step portion of the shaft.

Figure 11:
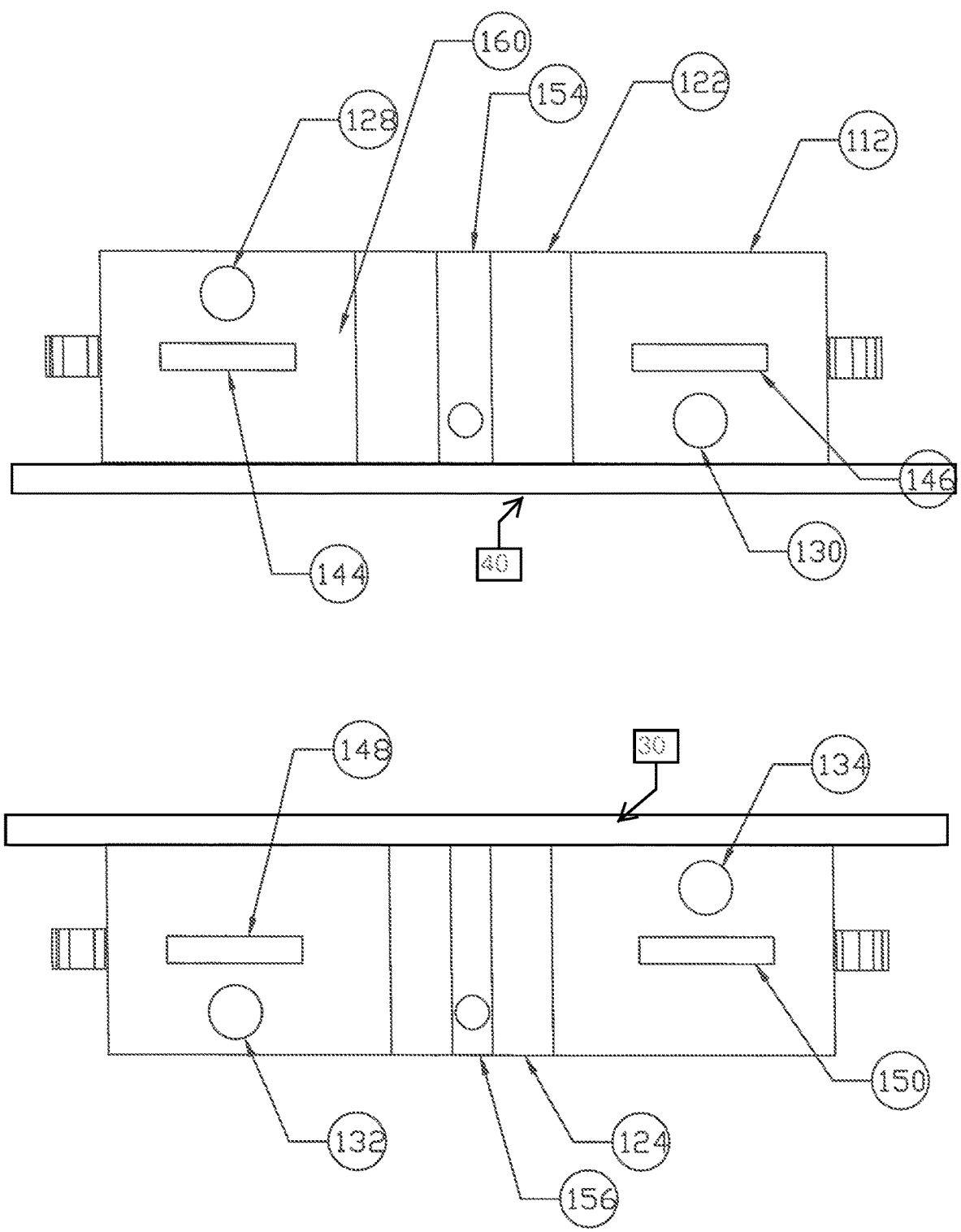
FIG. 11 is a diagram showing inner edge surfaces of the separated halves of the split drive sprocket assembly of FIG. 8, according to one embodiment.

FIG. 11 is a diagram showing inner edge surfaces of the separated halves of the split drive sprocket assembly 110. The male sprocket portion 112 includes an inner edge surface 160. The tabs 144 and 146 protrude from the inner edge surface 160. Also, the female sprocket portion 114 includes an inner edge surface 162. The indentations 148 and 150 are formed below the inner edge surface 162. The inner edge surfaces 160 and 162 are generally complementary and include the inner curved surface 122 and 124, respectively, wherein the inner curved surfaces 122 and 124 are bookended by first and second portions of the inner edge surfaces 160 and 162, respectively. When the sprocket assembly 110 is assembled, the inner curved surfaces 122, 124 (or shaft cutouts) form an opening for rotatably receiving a shaft so that the sprocket assembly 110 rotates on the shaft.

When the sprocket assembly 110 is assembled, the respective opposing end sections of the inner edge surfaces 160 and 162 interface with each other. Such interface results in a secure engagement because the two sides of the inner edge surface 160 of the male sprocket portion 112 include the tabs 144, 146 (or protrusions) that snugly nest in the corresponding indentations 148, 150 (or recesses) provided in the two sides of the inner edge surface 162 of the female sprocket portion 114. This arrangement provides a removable connection between the sprocket portions 112 and 114, preventing them from separating and moving relative to one another, both axially and radially.

Figure 12:
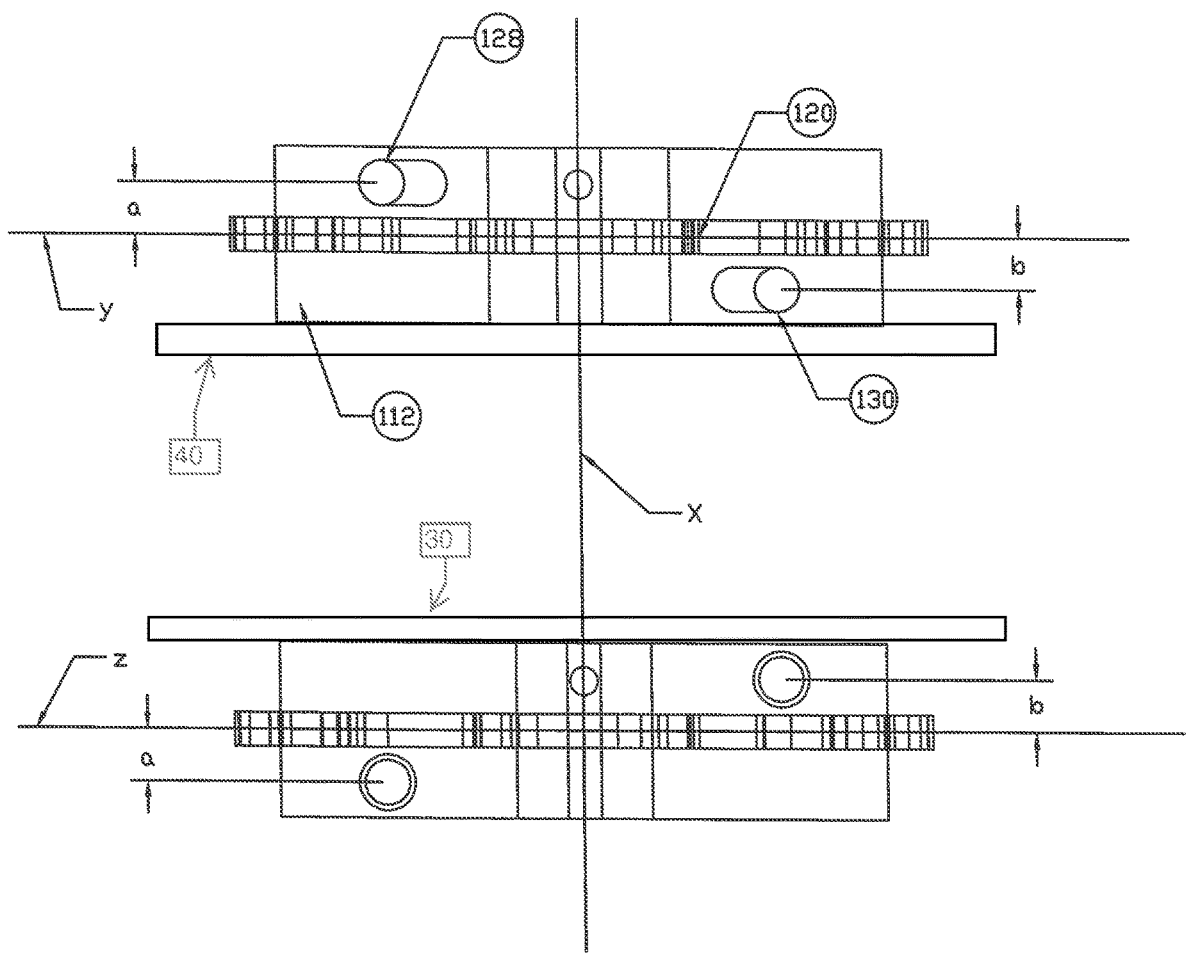
FIG. 12 is a diagram showing outer edge surfaces of the separated halves of the split drive sprocket assembly of FIG. 8, according to one embodiment.

FIG. 12 is a diagram showing outer edge surfaces of the separated halves of the split drive sprocket assembly 110. The male sprocket portion 112 is defined by a center radial plane y and female sprocket portion 114 is defined by a center radial plane z. When assembled, the planes y and z are configured to be aligned and will be substantially perpendicular to the rotational axis x.

On the male sprocket portion 112, the first bore 128 is shown being offset in a first direction by a distance "a" from the y plane and the second bore 130 is offset in a second, opposite direction by a distance "b" from the y plane. In some embodiments, a=b. Likewise, on the female sprocket portion 114, the third bore 132 is shown being offset in the first direction by the distance "a" from the z plane and the fourth bore 130 is offset in the second direction by the distance "b" from the z plane. Therefore, the bores 128 and 130 of the male sprocket portion 112 are positioned on opposite sides of the center radial plane y and the bores 132 and 134 of the female sprocket portion 114 are positioned on opposite sides of the center radial plane z.

An assembling method of using the sprocket assembly 110 disclosed above may include the following. A user (e.g., repair technician) may simply place the male and female sprocket portions 112 and 114 around a shaft so that the tabs or protrusions 144, 146 snugly nest in the corresponding indentations or recesses 148, 150. Then, the user inserts the first fastener 126a in the bores 128, 132 and inserts the second fastener 126b in bores 130, 134.

A disassembling method may be needed when the drive sprocket or any of the corresponding parts need to be replaced. In this method, the user may remove the fasteners 126a, 126b and pull the male and female sprocket portions 112 and 114 apart from each other.

It should be noted that the insert can be interchanged with a double threaded insert which is allowed to be screwed into the segment until it reaches the shoulder which locks it into place. Also, the bushing can be replaced with either of these inserts and the particular configuration is not limited to the explicit embodiments shown herein.

The split drive sprocket assembly 110 can be used in a conveyor system for driving a conveyor belt. Other uses of such a split drive sprocket assembly 110 may involve any conveyor or drive system including in the fields of agriculture, pharmacies, hospitals, factories, etc. The implementations may also include quick disconnect pillow block bearings, quick disconnect rollers, quick disconnect 2 bolt flange bearings, quick disconnect 4 bolt flange bearings, or other uses.

Regardless, when the sprocket is secured in place, the shoulders 40, 30 extend over the belt while the belt is moving so that the belt does not move so much that the teeth of the sprocket no longer connects with belt.

The above description defines various embodiments of a quick release split drive sprocket assembly, allowing a user to replace a drive sprocket and its corresponding parts easily and efficiently. It should be understood that the foregoing description relates to exemplary embodiments of the invention and that modifications may be made without departing from the spirit and scope of the present invention.

What is claimed is:

1. A split drive sprocket assembly, comprising:
    a first sprocket portion and a second sprocket portion configured to be joined along an opposing mating surface to form a cylindrical sprocket body;
    a series of teeth extending radially from a circumferential end of the first sprocket portion and the second sprocket portion;
    a first shoulder connected to the first sprocket portion and extending radially so as to extend from an axial further than the teeth extends from the axial and spaced axially apart from the teeth;
    a second shoulder that is (1) separate from the first shoulder portion so that the first and second shoulders can be attached and detached from each other, (2) connected to the second sprocket portion and extending radially so as to extend from the axial further than the teeth extends from the axial and (3) spaced axially apart from the teeth,
    wherein the first sprocket portion and the second sprocket portion are configured to engage a belt with the teeth and the first and second shoulder are configured to overlap with the belt while the teeth are engaged with the belt.

2. The split drive sprocket assembly of claim 1, further comprising:
    a recess defined the first sprocket portion;
    a protrusion extending from the second sprocket portion configured to cooperatively engage with the recess when the first sprocket portion and the second sprocket portion are joined together.

3. The split drive sprocket assembly of claim 1, further comprising:
    a fastener received within aligned apertures to join the first sprocket portion and the second sprocket portion.

4. The split drive sprocket assembly of claim 1, wherein each of the first sprocket portion and the second sprocket portion mate together to form a sprocket.

5. The split drive sprocket assembly of claim 4, wherein the first shoulder and second shoulder each extend from an end face of the first sprocket portion and the second sprocket portion, respectively.

6. The split drive sprocket assembly of claim 1, wherein each of the first sprocket portion and the second sprocket portion are semi-circular cylindrical bodies.

7. A method of driving a belt, the method comprising:
    joining a first sprocket portion and a second sprocket portion along an opposing mating surface to form a sprocket body, wherein a series of teeth extending radially from a circumferential end of the first sprocket portion and the second sprocket portion, wherein a first shoulder is connected to the first sprocket portion and extends radially so as to extend from an axial further than the teeth extends from the axial and spaced axially apart from the teeth, and wherein a second shoulder (1) is separate from the first shoulder portion so that the first and second shoulders can be attached and detached from each other, (2) is connected to the second sprocket portion and (3) extends radially so as to extend from the axial further than the teeth extends from the axial and spaced axially apart from the teeth;
    engaging the teeth of the first sprocket portion and the second sprocket portion with a belt such that while the teeth are engaged with the belt, the first and second shoulder are configured to overlap with the belt; and
    rotating the sprocket body so that the teeth apply rotational torque on the belt to move the belt while the belt overlaps with the first and second shoulders.

* * * * *